(12) United States Patent
Mowatt et al.

(10) Patent No.: US 11,195,131 B2
(45) Date of Patent: Dec. 7, 2021

(54) INCREASING USAGE FOR A SOFTWARE SERVICE THROUGH AUTOMATED WORKFLOWS

(71) Applicant: Microsoft Technology Licensing, LLC, Redmond, WA (US)

(72) Inventors: David Mowatt, Dublin (IE); Terry Farrell, Dublin (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 89 days.

(21) Appl. No.: 15/975,182

(22) Filed: May 9, 2018

(65) Prior Publication Data

US 2019/0347585 A1 Nov. 14, 2019

(51) Int. Cl.
*G06Q 10/06* (2012.01)
*G06F 16/23* (2019.01)
*H04L 29/08* (2006.01)

(52) U.S. Cl.
CPC ......... *G06Q 10/0633* (2013.01); *G06F 16/23* (2019.01); *H04L 67/22* (2013.01)

(58) Field of Classification Search
None
See application file for complete search history.

(56) References Cited

U.S. PATENT DOCUMENTS

| | | | |
|---|---|---|---|
| 5,058,008 A | 10/1991 | Schumacher | |
| 5,740,537 A * | 4/1998 | Berning | H04W 16/02 455/450 |
| 9,547,998 B2 | 1/2017 | Sadeh-Koniecpol et al. | |
| 9,620,026 B2 | 4/2017 | Strode et al. | |
| 2004/0221239 A1 | 11/2004 | Hachigian et al. | |
| 2006/0010236 A1* | 1/2006 | Meiser | H04L 67/306 709/226 |
| 2006/0047544 A1* | 3/2006 | Habon | G06F 9/453 715/765 |
| 2008/0070218 A1 | 3/2008 | Ahl et al. | |
| 2008/0254419 A1 | 10/2008 | Cohen | |
| 2009/0030721 A1 | 1/2009 | Garcia et al. | |

(Continued)

OTHER PUBLICATIONS

Oracle Health Sciences Design Environment Cloud Service, Service Level Guide, Oracle (Year: 2016).*

(Continued)

*Primary Examiner* — Akosua Kyereme-Tuah
(74) *Attorney, Agent, or Firm* — Michael Best & Friedrich LLP

(57) ABSTRACT

Systems and methods for increasing usage for a software service. One example system includes a database storing workflow data for the service, user profile data for a plurality of users, and service usage data for the users; and an electronic processor. The electronic processor is configured to determine a target user engagement level for the service. The electronic processor is configured to retrieve from the database based on the service, a first workflow action, and to execute the first workflow action for the plurality of users. The electronic processor is configured to receive, from the service, a usage level for a user of the plurality of users, and to compare the usage level for the user to the target level for the service. The electronic processor is configured to, when the usage level fails to exceed the target, execute an additional workflow action, different from the first, for the user.

20 Claims, 6 Drawing Sheets

(56) References Cited

U.S. PATENT DOCUMENTS

| | | | |
|---|---|---|---|
| 2009/0077210 A1* | 3/2009 | Musman | H04L 41/5032 709/223 |
| 2011/0296370 A1* | 12/2011 | Ferris | G06F 8/71 717/100 |
| 2012/0204150 A1* | 8/2012 | Mohan | G06F 11/3612 717/121 |
| 2013/0111363 A1 | 5/2013 | Linton | |
| 2013/0151431 A1 | 6/2013 | Linton et al. | |

OTHER PUBLICATIONS

"10 Best Practices for Driving Enterprise Software Adoption", In White Paper of Multimedia Plus, Oct. 2014, pp. 1-6.

"Chorus: 15 tips to increase CRM user adoption", Retrieved From <<https://www.chorus.co/filters/news/15-tips-to-increase-crm-user-adoption/>>, Retrieved on: Mar. 3, 2018, 5 Pages.

"Employee Training Isn't What It Used To Be", Retrieved From <<https://web.archive.org/web/20150101021046/http:/www.theatlantic.com/sponsored/ibm-transformation/employee-training-isnt-what-it-used-to-be/249/>>, Jan. 1, 2015, 5 Pages.

"How do drive CRM Adoption", In White Paper of Ziff Davis, Retrieved on: Mar. 3, 2018, pp. 1-5.

"Productivity Library Discover what's possible with Office 365", Retrieved From <<https://productivitylibrary.fasttrack.microsoft.com/en-us/office/envision/productivitylibrary/meet-and-collaborate-with-ease>>, Retrieved on: Mar. 3, 2018, 5 Pages.

"User adoption communication Introduce new systems to staff easily with these 6 tips", Retrieved From <<https://web.archive.org/web/20160314033116/https:/www.snapcomms.com/solutions/user-adoption-communication>>, Mar. 14, 2016, 10 Pages.

"Walkme: The Digital Adoption Platform", Retrieved From <<https://www.walkme.com/digital-adoption-platform/>>, Retrieved on: Mar. 6, 2018, 5 Pages.

Augustin, Xavier, "Successful Salesforce Adoption: 10 Best Practices of CRM Implementation", Retrieved From <<https://saleschakra.com/en/successful-salesforce-adoption-10-best-practices-of-crm-implementation/>>, Mar. 1, 2016, 12 Pages.

Chmielowski, Beth, "10 Ways to Drive Cloud Adoption: Focus on the User (Part 2)", Retrieved From <<https://hub.appirio.com/cloud-powered-blog/10-ways-to-drive-cloud-adoption-focus-on-the-user-part-2>>, Jan. 27, 2012, 5 Pages.

Chmielowski, Beth, "10 Ways to Drive Cloud Adoption: It's Not Just Training (Part 1)", Retrieved From <<https://hub.appirio.com/cloud-powered-blog/10-ways-to-drive-cloud-adoption-it-s-not-just-training-part-1>>, Jan. 25, 2012, 5 Pages.

Corrighan, Catherine, "How to drive adoption of new technology", Retrieved From <<https://community.dynamics.com/b/dynamicsblog-en-gb/archive/2014/03/03/how-to-drive-adoption-of-new-technology>>, Mar. 3, 2014, 5 Pages.

Foxall, Dave, "6 Tactics to Improve Employee Self Service Software Adoption Rates", Retrieved From <<https://web.archive.org/web/20120219223451/http:/www.hrlab.com/employee-self-service-adoption.php>>, Feb. 19, 2012, 2 Pages.

Hall, Becki, "5 Strategies to help employees adopt new technology", Retrieved From <<https://www.interact-intranet.com/5-strategies-to-help-employees-adopt-new-technology/>>, Jun. 26, 2017, 9 Pages.

Knight, Rebecca, "Convincing Skeptical Employees to Adopt New Technology", Retrieved From <<https://hbr.org/2015/03/convincing-skeptical-employees-to-adopt-new-technology>>, Mar. 19, 2015, 7 Pages.

Lent, Jennifer Van, "Top 10 Ways to Drive User Adoption of your Software Platform", Retrieved From <<https://thedmcollaborators.com/2014/02/17/top-10-ways-to-drive-user-adoption-of-your-software-platform/>>, Feb. 17, 2014, 3 Pages.

"International Search Report and Written Opinion Issued in PCT Application No. PCTUS2019029763", dated Jul. 5, 2019, 10 Pages.

\* cited by examiner

Home > Reports > Campaigns > NewApp Adoption Campaign

Summary

Campaign Status: Active (pause)

| | |
|---|---|
| Goals | Drive Awareness -- 100% employees (edit) |
| | Take Online Training -- 0% employees (edit) |
| | Attend In-person Training -- 0% employees (edit) |
| Start Date | Today |
| | 8 March 2018 (edit) |

Campaign Progress

| | |
|---|---|
| Progress | [ 0% ] |
| Last Activity | Support site created: http://NewApp.support |
| Next Activity | Announcement email (edit) |
| | 8 March 2018 -- 11:00 am |

Recommended Actions

Specify key stakeholders

Stakeholders: None specified (add)

Specify one or more stakeholders who want to make sure that your users become more productive (or your organization becomes more successful) because Application is used more.

For example, the head of a sales department may be keen to verify that a customer insights add-in is used by the sales team.

Stakeholders will be able to access this dashboard and modify all information related to the Application Campaign.

Organize training

Training scheduled: 0 sessions (add)

In-person training allows you to reinforce the value of using this service, and gets all users up to speed with maximizing productivity with NewApp.

Webinars scheduled: 0 sessions (request)

NewApp has already been asked to send you a list of training options such as webinars.

Print flyers

Flyer -- NewApp for Marketing: download  Active

Flyer -- NewApp for Sales: download  Active

Use printable flyers to raise awareness among employees.

You can customize flyers to use your own branding and reference your organization's tools/processes.

Groups

You can define who should be aware of NewApp and who must take training.

Sample groups have been autogenerated but you may also create/use your own groups.

Groups
- Hilda Smith (422 users) -- VP Sales
- Gert Salamander (74 users) -- VP HR
- John Hilly (8 users) -- VP Biz Development
- John Kinoh (130 users) -- VP Marketing
- Terry Farl (89 users) -- VP Retail Sales

| | | |
|---|---|---|
| Email Awareness campaign (edit): | 1241 users | (edit) |
| Show In-product Introduction (view): | 1241 users | (edit) |
| Require Online Training (edit material): | 0 users | (edit) |
| Require in-person training (schedule): | 0 users | (edit) |
| Send Manager reports (view): | disabled | (enable) |

Timeline

Today — An introductory email (edit email) will be sent to all users introducing them to NewApp
• Early adopters of the add-in will be prompted to sign up as champions to support other users getting started (learn more)

Day 3 — An adoption email (edit email) will be sent to managers showing who on their team has required engagement, but has not yet tried the add-in.

FIG. 4

INCREASING USAGE FOR A SOFTWARE SERVICE THROUGH AUTOMATED WORKFLOWS

FIELD

Embodiments described herein relate to monitoring software usage levels, and, more particularly, to increasing usage of software services through the use of automated workflows including for example, providing a platform for multiple software companies to increase usage.

SUMMARY

Organizations periodically upgrade their information technology infrastructure. Existing software services (for example, applications, websites, and the like) may be upgraded or new software services may be added. Such additions or upgrades may be required (for example, for compliance with laws or industry standards), while others may enable users to perform tasks more efficiently. Some upgrades represent a fundamental change (for example, moving to electronic document management), while others are more incremental (for example, upgrading a word processor to the next version). Regardless of the nature of the upgrade, it is important that the user base of the organization begin and continue to use the upgraded technology to ensure compliance, improve worker efficiency, improve cost effectiveness, and the like. However, some users may lack awareness of the upgrades, training, or motivation to use the new software service capabilities.

For example, a user may ignore an upgraded software service due to a pressure to meet existing time and resource commitments, a lack of understanding about how an upgraded software service, or a combination thereof. For example, users may not take the time to proactively explore new software capabilities, preferring instead to use past software features that are "good enough." This situation may be exacerbated when it takes time to demonstrate the value of the technology to the user, or when the value applies collectively to the organization, but may not necessarily affect the user personally. For example, an added software service for regulatory compliance may benefit the organization as a whole but may represents an additional workload to an individual user.

To address this concern, labels are sometimes places on upgraded services. For example, new menu items on a website may be labeled as "new." However, while technology enthusiasts are generally motivated to try new features, many users will not stray from their known operating habits long enough to try out the "new" features. In-person training sessions may also be organized for upgraded software services. However, this may be costly and may not be necessary for all users, which results in wasted time and money. Also, it is difficult to know if the training is having a positive effect on usage levels. In some instances, vendors of software services may also provide emails or other types of electronic communication to users highlighting upgraded services. However, emails from vendors are often ignored and do not target specific users.

Artificial intelligence may also be used to detect that a user is about to perform a task where the user would benefit from an upgraded service. For example, if a word processor detects that a user is manually changing the font style to the same style repetitively, the word processor may ask if the customer wishes to use a new feature to automatically apply their preferred font style. However, such intelligence does not work for all scenarios and can be time consuming to develop effectively due to the high cost for research and analysis.

Thus, embodiments described herein provide, among other things, systems and methods for automatically increasing usage of a software service. For example, steps in an automated workflow are executed to drive software service usage by the user base of an organization above a target level or levels. A first workflow action is executed to inform all users that a new software service is available (for example sending out a group email). After the first workflow action, usage levels for users of the service are collected and compared to target usage levels. When the target usage level has not been met, additional workflow actions are taken until the target usage level is met. Target usage levels may be individual (for example, each user achieving some level of usage) or collective (for example, a target percentage of users achieving some level of usage). Using such embodiments, training and other resources are conserved, because only those users who have yet to use the software service are targeted. Workflows, training, and target usage levels can be customized for the organization or groups within the organization. As a result, greater increases in software service utilization can be achieved, making efficient use of new software services, improving employee productivity, and reducing costs for the organization. Such embodiments may be used directly by an organization within its information technology infrastructure to drive usage increases. Embodiments may also be used by hosted service providers, which provide software services to many organizations and execute workflows to drive usage within the organizations according to targets set by the organizations. Furthermore, embodiments may integrate with third parties (for example, software vendors) to accept workflows and training collateral for driving usage within one or more organizations.

For example, one embodiment provides a system for increasing usage for a software service. The system includes at least one database storing workflow data for the software service, user profile data for a plurality of users, and software service usage data for the plurality of users and at least one electronic processor communicatively coupled to the database. The electronic processor is configured to determine a target user engagement level for the software service. The electronic processor is configured to retrieve from the at least one database based on the software service, a first workflow action. The electronic processor is configured to execute the first workflow action for the plurality of users. The electronic processor is configured to receive, from the software service, a usage level for a user of the plurality of users. The electronic processor is configured to compare the usage level for the user to the target user engagement level for the software service. The electronic processor is configured to, when the usage level fails to exceed the target user engagement level, execute an additional workflow action, different from the first workflow action, for the user.

Another embodiment provides a method for increasing usage for a software service. The method includes determining, with at least one electronic processor, a target user engagement level for the software service. The method includes retrieving, from at least one database storing workflow data for the software service, user profile data for a plurality of users, and software service usage data for the plurality of users, a first workflow action based on the software service. The method includes executing the first workflow action for the plurality of users. The method includes receiving, from the software service, a usage level for a user of the plurality of users. The method includes comparing the usage level for the user to the target user engagement level for the software service. The method includes executing an additional workflow action, different from the first workflow action, for the user when the usage level fails to exceed the target user engagement level. The method includes repeating the steps of executing, receiving, and comparing while the usage level fails to exceed the target user engagement level.

A further embodiment provides a non-transitory computer-readable medium including instructions executable by an electronic processor to perform a set of functions. The set of functions includes determining a target user engagement level for the software service. The set of functions includes retrieving, from at least one database storing workflow data for the software service, user profile data for a plurality of users, and software service usage data for the plurality of users, a first workflow action based on the software service. The set of functions includes executing the first workflow action for the plurality of users. The set of functions includes receiving, from the software service, a usage level for a user of the plurality of users. The set of functions includes comparing the usage level for the user to the target user engagement level for the software service. The set of functions includes executing an additional workflow action, different from the first workflow action, for the user when the usage level fails to exceed the target user engagement level. The set of functions includes repeating the functions of executing, receiving, and comparing while the usage level fails to exceed the target user engagement level.

BRIEF DESCRIPTION OF THE DRAWINGS

FIG. 4 illustrates a graphical user interface element for use with the system of FIG. 1 according to some embodiments.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
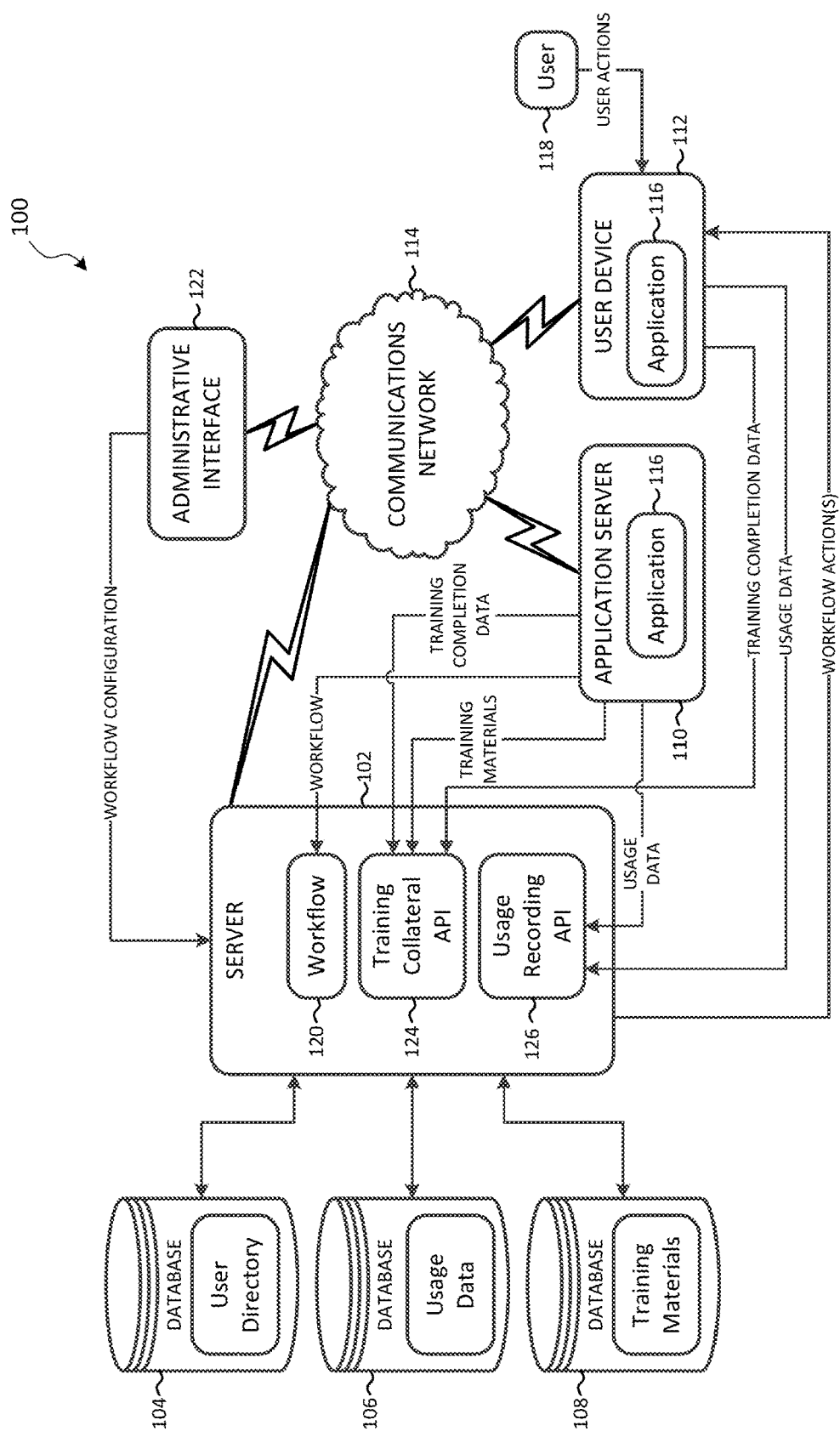
FIG. 1 schematically illustrates a system for increasing usage of a software service according to some embodiments.

FIG. 1 schematically illustrates a system 100 for increasing usage of a software service. In the example illustrated in FIG. 1, the system 100 includes a server 102, a user database 104, a usage database 106, a training materials database 108, an application server 110, and a user device 112. It should be understood that the system 100 is provided as an example and, in some embodiments, the system 100 may include additional components. For example, the system 100 may include multiple servers 102, multiple application servers 110, multiple user devices 112, or combinations thereof. In particular, it should be understood that although FIG. 1 illustrates a single user device 112, the system 100 may include tens, hundreds, or thousands of user devices (and their accompanying users).

The server 102, the application server 110, and the user device 112 are communicatively coupled via a communications network 114. The communications network 114 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

As illustrated in FIG. 1, to provide the services described herein, the server 102 may communicate with the user database 104, the usage database 106, and the training materials database 108. The databases 104, 106, 108 (or portions thereof) may be housed on suitable database servers communicatively coupled to and accessible by the server 102, housed on the same physical machine or in the same data center, included in the server 102 (for example, within the storage device 204), or combinations thereof. In alternative embodiments, the databases 104, 106, 108 are part of a cloud-based database system external to the system 100 and accessible by the server 102 over one or more additional networks.

Embodiments described herein are directed to driving the usage of a software service by one or more users to increase usage within one or more organizations. As used herein, the term "software service" may refer to a software application, for example, the application 116, or a particular feature or function of an application (for example, a grammar checker in a word processor) or a particular feature of function of a website (for example, a particular form on a website. In some embodiments, the application 116 is hosted on the application server 110 and accessed remotely. A user (for example, the user 118) may access the functionality provided by the application 116 using a web-browser, a dedicated software client, graphical user interface tools, command-line tools, or the like via the user device 112 and the communications network 114. In some embodiments, the application 116 is stored and executed locally on the user device 112. In some embodiments, the application server 110, the user device 112, or both are operated by a single organization for one or more user bases of that organization. In some embodiments, the application server 110 hosts the application 116, multiple instances of the application 116, or multiple different applications for one or more organizations. In some embodiments, the application 116 is one of the Microsoft Office® suite of applications (for example, Outlook®, Word®, Excel®, PowerPoint®, and the like). The application 116 may also be a website or web-enabled application. Alternative embodiments execute more than one application 116.

It should be understood that the term "software service" may also refer to a software application integrated with a particular type of user device 112 (for example, a device embedded with electronics, software, sensors, actuators, and network connectivity (known as connected devices, smart devices, or Internet of Things (IoT) devices). For example, an organization may provide portable electronic devices that include software and hardware for digitally collecting customer signatures or reading barcodes and the systems and methods described herein may be used to increase usage of these electronic devices (through monitoring usage of one or more software applications or hardware components implemented by such devices).

As described in more detail below with respect to FIG. 3, the server 102 implements at least one workflow (for example, the workflow 120) to drive increased usage for a software service. Workflows, (for example, the workflow 120) include a plurality of workflow actions, which are executed to increase use of a particular software service by one or more users. Workflows also include rules (for example, usage level targets, timelines, and the like) for when workflow actions are executed. In some embodiments, workflows are received by the server 102 from the application server 110 and stored locally on the server 102 (for example, in a database). For example, in some embodiments, when a new application is installed on the application server 110, a workflow for the new application is transmitted to the server 102. In another example, when an application is upgraded on the application server 110, an updated workflow for the new application features is transmitted to the server 102. In some embodiments, the system 100 includes an administrative interface 122 (described more particularly below with respect to FIG. 4) that can be used to enter and customize workflow information. In some embodiments, the administrative interface 122 is generated by the server 102 (for example, using a web-based application). In other embodiments, the administrative interface 122 is separate from and interacts with the server 102. For example, the administrative interface 122 may be a dedicated software application executed by a remote computing device, accessing the server 102 through the communications network 114. Through the administrative interface 122, an organization can manage, among other things, usage level targets for its software services. In some embodiments, third party organizations acting as administrators on behalf of other organizations may use the administrative interface 122 to configure workflows and usage level targets for the other organizations.

Workflow actions include, among other things, the presentation to users of training materials (for example, instructional videos, documentation, and tutorials), which are stored in the training materials database 108. In some embodiments, training materials are received by the server 102 from the application server 110. For example, in some embodiments, when a new application is installed or upgraded on the application server 110, training materials for the application are transmitted to the server 102 and received by the training collateral application programming interface (API) 122 using a predetermined format and protocol. In some embodiments, the application 116, the application server 110, the user device 112, or combinations of the foregoing will report to the server 102 as a user completed the training assigned to him or her. In some embodiments, training progress and completion data is received by the training collateral application programming interface (API) 122 using a predetermined format and protocol. In some embodiments, training progress and completion data is stored in the training materials database 108.

As described in more detail below with respect to FIG. 3, the server 102 executes workflow actions based on, among other things, usage data for users of the software service. The server 102 receives usage data from the application server 110, the user device 112, or both, through the communications network 114. The server 102 stores usage data to, and receives usage data from, the usage database 106. The usage database 106 includes one or more records for each of the software services for which usage is being monitored using the system 100. In some embodiments, the server 102 operates a usage recording API 126, which receives the usage data from the user device 112. In some embodiments, the software service (for example, the application 116) monitors its usage and sends usage data to the usage recording API 126 using a predetermined format and protocol. Usage data is collected for an organization's users and may include indications of how each user (for example, the user 118) interacts with a software service (for example, the application 116). In some embodiments, usage data may be an indication that the software service has been launched by the user. In other embodiments, usage data includes more granular information regarding the usage of the software service, such as, for example, indications that a user has manipulated particular graphical user interface elements, opened or closed documents or other data stores via the software service, entered data into documents, saved a document, printed a document, selected an application feature, and the like.

In some embodiments, usage data includes a usage level. A usage level may indicate the quantity of the user's use of the software service. For example, a usage level may indicate the total usage time by the user of the software service, how many individual times the user has used or accessed the software service, the amount of usage (for example, time spent in an application) by the user of the software service that occurred during a time period (for example, a particular day or range of hours during the day), a usage frequency (for example, hourly, daily, weekly), the amount of data processed by the user using the software service, and the like. A usage level may also indicate that a use of the software service was not trivial. For example, a usage level may indicate whether a document exceeds a certain minimum size. In another example, a usage level may include indications of whether the user has taken one or more specified actions within the software service, which indicate actual substantive use of the software service (versus simply opening an application and not using it). For example, actions such as saving documents, printing, setting preferences, or performing certain sequences of tasks within the application may be set as indicating a non-trivial or acceptable use of the application by a user. In some embodiments, a usage level is transmitted for all users even if some usage levels for some users indicate no use by the user.

As noted, usage data for a software service is linked to particular users of the software service. To link usage data to users, the server 102 accesses user profile data from the user database 104. The user database 104 includes a user directory that electronically stores a list of all users for one or more organizations, along with their user profile data. In some embodiments, the user database 104 implements the Microsoft Azure® Active Directory. The user profile data includes user profiles, which are unique to and associated with individual users of the user device 112, the application server 110, and the application 116. For example, the user profiles may include user account information, security permissions, (for example, file or application permissions), device preferences (for example, network settings), application settings or preferences (for example, toolbar and other control layouts, graphical themes, document formatting preferences, spell check preferences, customized dictionaries, and the like), or personal information (for example, name, email addresses, phone numbers, and the like) for the user, or the like. In some embodiments, the user database 104 stores metadata for the users, including hierarchical relationships within the organization (that is, which users are managers of which other users), job titles, department names, and the like.

Figure 2:
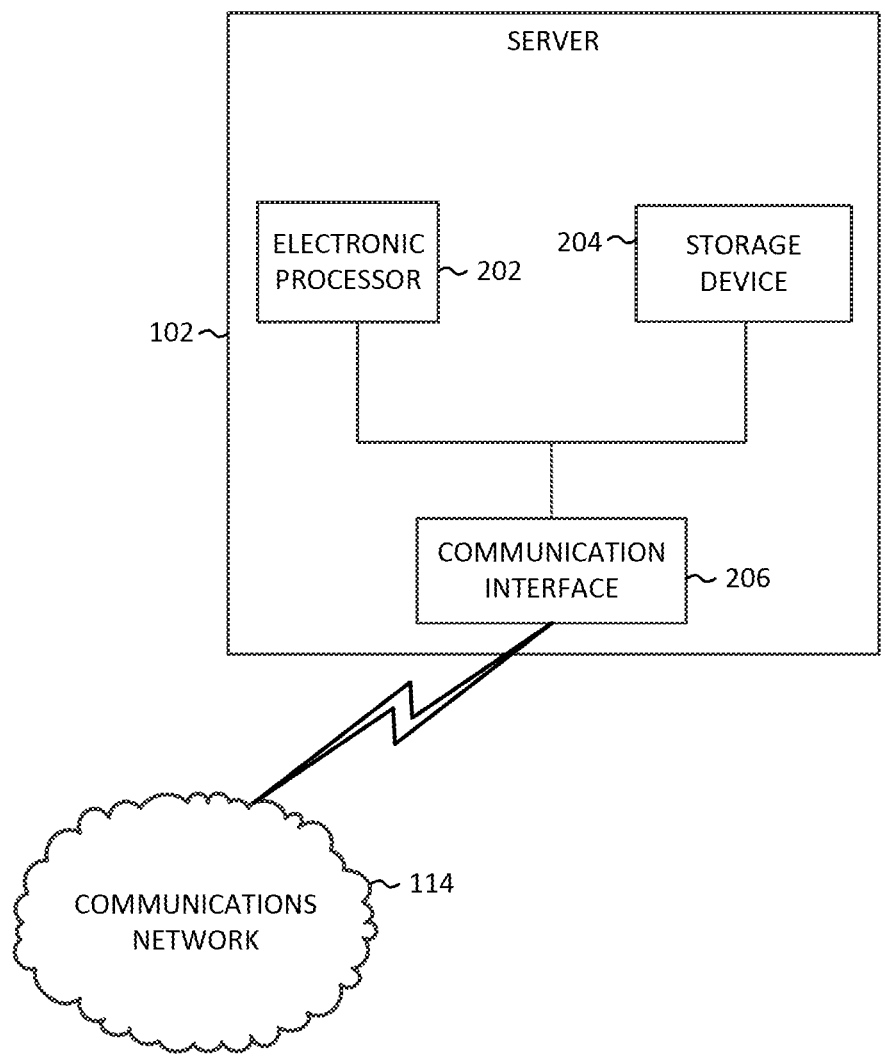
FIG. 2 is a block diagram of a server included in the system of FIG. 1 according to some embodiments.

FIG. 2 schematically illustrates the server 102 in more detail. As illustrated in FIG. 2, the server 102 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 114 and, optionally, one or more additional communications networks or connections. It should be understood that the server 102 may include additional components than those illustrated in FIG. 2 in various configurations and may perform additional functionality than the functionality described in the present application. Also, it should be understood that the functionality described herein as being performed by the server 102 may be distributed among multiple devices, such as multiple servers and may be provided through a cloud computing environment, accessible by components off the system 100 via the communications network 114.

The electronic processor 202, the storage device 204, and the communication interface 206 included in the server 102 communicate wirelessly, over one or more communication lines or buses, or a combination thereof. The electronic processor 202 is configured to retrieve from the storage device 204 and execute, among other things, software related to the control processes and methods described herein. For example, FIG. 3 illustrates a method 300 for increasing usage for a software service performed by the server 102 according to one embodiment.

In some embodiments, the server 102 performs machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics. For example, the server 102 can be configured to use various machine learning functions to develop workflows and targets as described herein.

The application server 110 is a network-attached and accessible computer server that includes similar components as the server 102. The application server 110 executes the application 116, which provides software services used by the users of the application server 110. In some embodiments, users access the application 116 via the communications network 114 using personal computing devices (for example, the user device 112).

The user device 112 is a personal computing device (for example, a desktop computer, a laptop computer, a terminal, a tablet computer, a smart telephone, a wearable device, or the like) that includes similar components as the server 102. In some embodiments, the user device 112 is used to access functionality provided by the application server 110 via the communications network 114. In some embodiments, the user device 112 executes applications locally.

Figure 3:
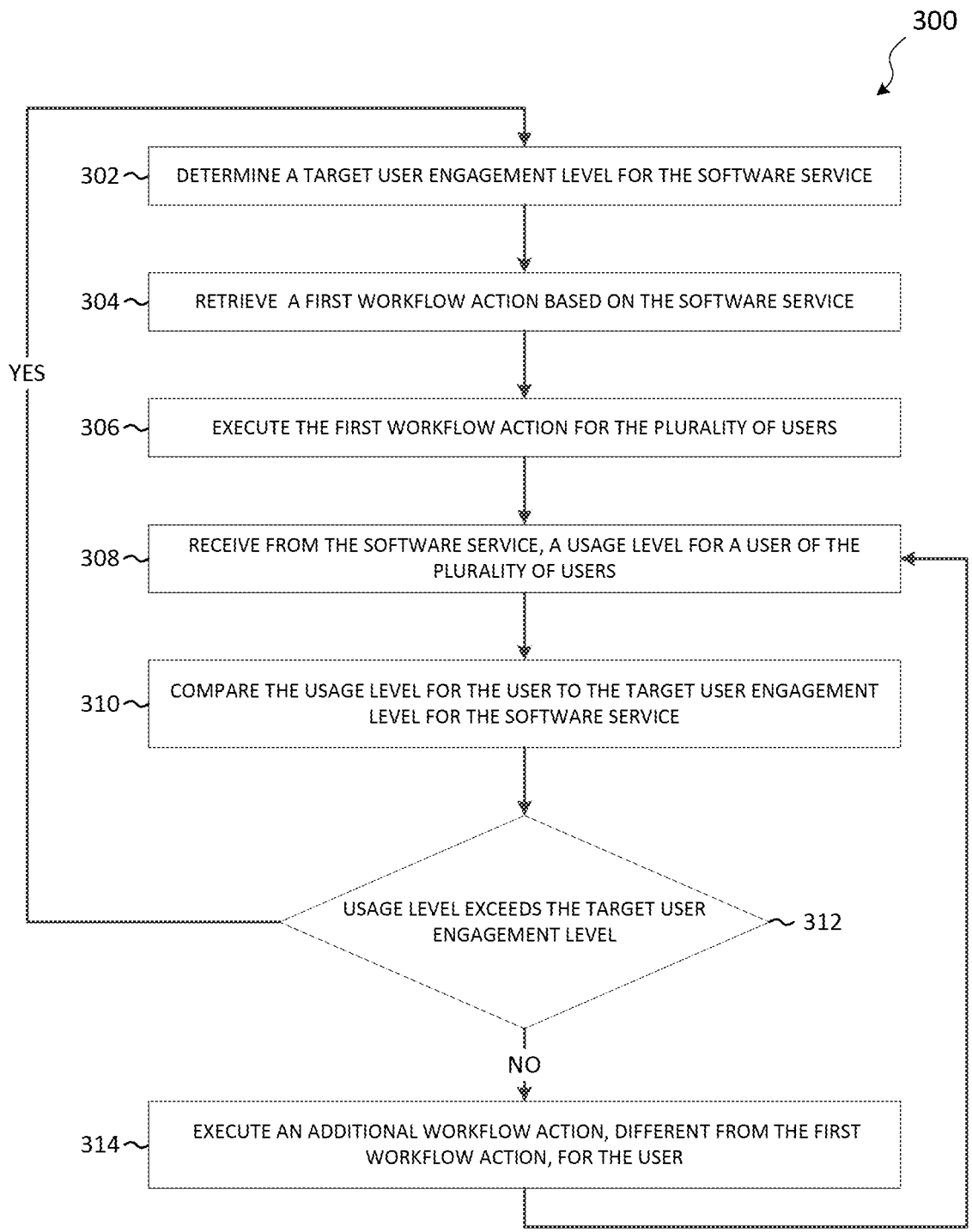
FIG. 3 is a flowchart illustrating a method for increasing usage for a software service using the system of FIG. 1 according to some embodiments.

FIG. 3 illustrates an example method 300 for increasing usage for a software service. The method 300 is described as being performed by the server 102 and, in particular, the electronic processor 202. However, it should be understood that in some embodiments, portions of the method 300 may be performed by other devices, including for example, the application server 110 and the user device 112. The method 300 is also described in terms of driving usage for a single application 116 within a single organization. However, it should be understood that embodiments of the method 300 may be used for driving usage for multiple applications within a single organization and single or multiple applications across multiple organizations.

As illustrated in FIG. 3, the electronic processor 202 determines a target user engagement level for the software service (at block 302). As used in this example, the target user engagement level is a target to be met by individual users of the software service. As noted above, the target user engagement level may represent engagement with particular aspects of the software service (for example, selecting a new menu item), engagement with the software service generally (for example, launching the software service a specified number of times), a frequency of either type of engagement, combinations of the foregoing, and the like. In some embodiments, the electronic processor 202 determines the target user engagement level by accessing the workflow for the software service. In some embodiments, the electronic processor 202 receives the target user engagement level for the software service via the administrative interface 122.

Based on the software service, the electronic processor 202 retrieves a first workflow action (at block 304). In some embodiments, the electronic processor 202 retrieves the first workflow action from the workflow 120. In some embodiments, the workflow action is retrieved from a workflow stored on an external database (for example, the training materials database 108, a database stored on the application server 110, or another database). In some embodiments, the electronic processor 202 retrieves the first workflow action from the administrative interface 122.

Regardless of the source of the workflow action, the electronic processor 202 executes the first workflow action for a plurality of users within the organization (at block 306). In some embodiments, the plurality of users includes a plurality of users of one or more organizations. In some embodiments, the plurality of users only includes users licensed to use the software service, users who are not already using the software service, users in particular departments, subscription levels, teams, or projects, or the like. In some embodiments, the first workflow action includes generating an email to the users, generating an in-product notification (for example, in the event of a new feature in an already-used software application), presenting a training document, presenting a training video, presenting a support website link, and the like. For example, an email announcing the new service may be a message from someone in the organization's management (for example, a CEO or VP) including a particular call to action about why the software service is beneficial to their particular organization. In some embodiments, the email provides embedded training materials (for example, a video tutorial) or hyperlinks to training materials. In another example, a pop-up alert may appear when a user logs in, which presents the user with an announcement of the new service, and providing hyperlinks to training materials. In some embodiments, the first workflow action is tailored based on user characteristics (for example, retrieved from the user database 104). For example, members of the sales team may receive an announcement explaining how their team gets value from using the software service, while members of the human resources team receive an announcement explaining the value to their team (for example, by focusing on how the software service makes it easier to perform job duties particular to the respective teams). In some embodiments, executing a workflow action (for example, presenting training to the user) may be triggered by a particular user action. For example, when a user launches the software service or a different software service, accesses predetermined data within the software service or a different software service (for example, opening a particular document template), or performs a predetermined action within the software service or a different software service (for example, saving a file, printing a file, or the like), the user is prompted to take training on the newly-deployed software service, such as a new accounting software package, that the organization wishes them to use. In some embodiments, opening an older version of the application may present the user with a prompt to use the newer version of the application. In some embodiments, the prompt to use the newer version includes the previously-described call to action, links to training materials, and the like.

Thereafter, the electronic processor 202 receives, from the software service or the API 126, a usage level for a user of the plurality of users (at block 308). For example, the application 116 operating on the user device 112 may send usage data for the user 118 to the server 102. As noted above the usage data may include indications of a total usage by the user of the software service, an amount of usage by the user of the software service during a time window, the user taking one or more specified actions within the software service, or combinations of the forgoing. In some embodiments, the software service is configured to send all usage data to the server 102. In some embodiments, the software service is configured to send only usage data relevant to the target user engagement level. For example, when the target user engagement level measures the use of a particular action within the application 116, only usage data on that particular action is sent. In some embodiments, the usage recording API 126 is configured to accept or store only usage data relevant to the target user engagement level.

In some embodiments, the usage level is a success metric (that is, a measure of increased productivity by a user that is attributable to usage of the software service. One example success metric is a decrease in the completion time for a particular task. For example, if the time it takes to produce an invoice decreases, this would be a success indicator for a new accounting software service. Another example success metric is a decrease in user errors. Another example success metric is an increase in the amount of documents a user is sharing with other users. Another example success metric is an increase in the size of collaboration teams. Another example success metric is a decrease in the amount of calls to technical support. Another example success metric is a reduction in spending on training. Another example success metric is a higher measure of product satisfaction (for example, as measured by customer or user surveys).

The electronic processor 202 compares the usage level for the user to the target user engagement level for the software service (at block 310). In some embodiments, this comparison is done periodically for each user or software service. In some embodiments, the comparisons are performed after waiting some period of time to allow for the first workflow action to have an effect on usage. For example, the electronic processor 202 may wait for one week after an introductory email is sent out before it begins comparing the received usage data against the target user engagement level for the software service.

Optionally, in some embodiments, the usage levels are weighted more heavily when comparing them to the target user engagement level. For example, usage data gathered more recently may be weighted more heavily than usage data gathered closer to the first workflow action being executed. In another example, the usage level may be weighted based on a characteristic of the user. In such embodiments, the electronic processor retrieves (for example, from the user database 104), at least one user characteristic for the user. User characteristics may include, for example, the role of the user within the organization. The electronic processor 202 assigns a weight to the usage level for the user based on the at least one user characteristic. For example, when the user is a member of the information technology team, their usage level may be weighted less heavily because it is expected that such users will use most software services. The electronic processor 202 determines, for the user, a weighted usage level based on the usage level and the weight. For example, a usage level of 70% and a weight of +20% may result in a weighted usage level of 90%. In such embodiments, the electronic processor compare the usage level for the user to the target user engagement level for the software service by comparing the weighted usage level to the target user engagement level.

Figure 5:
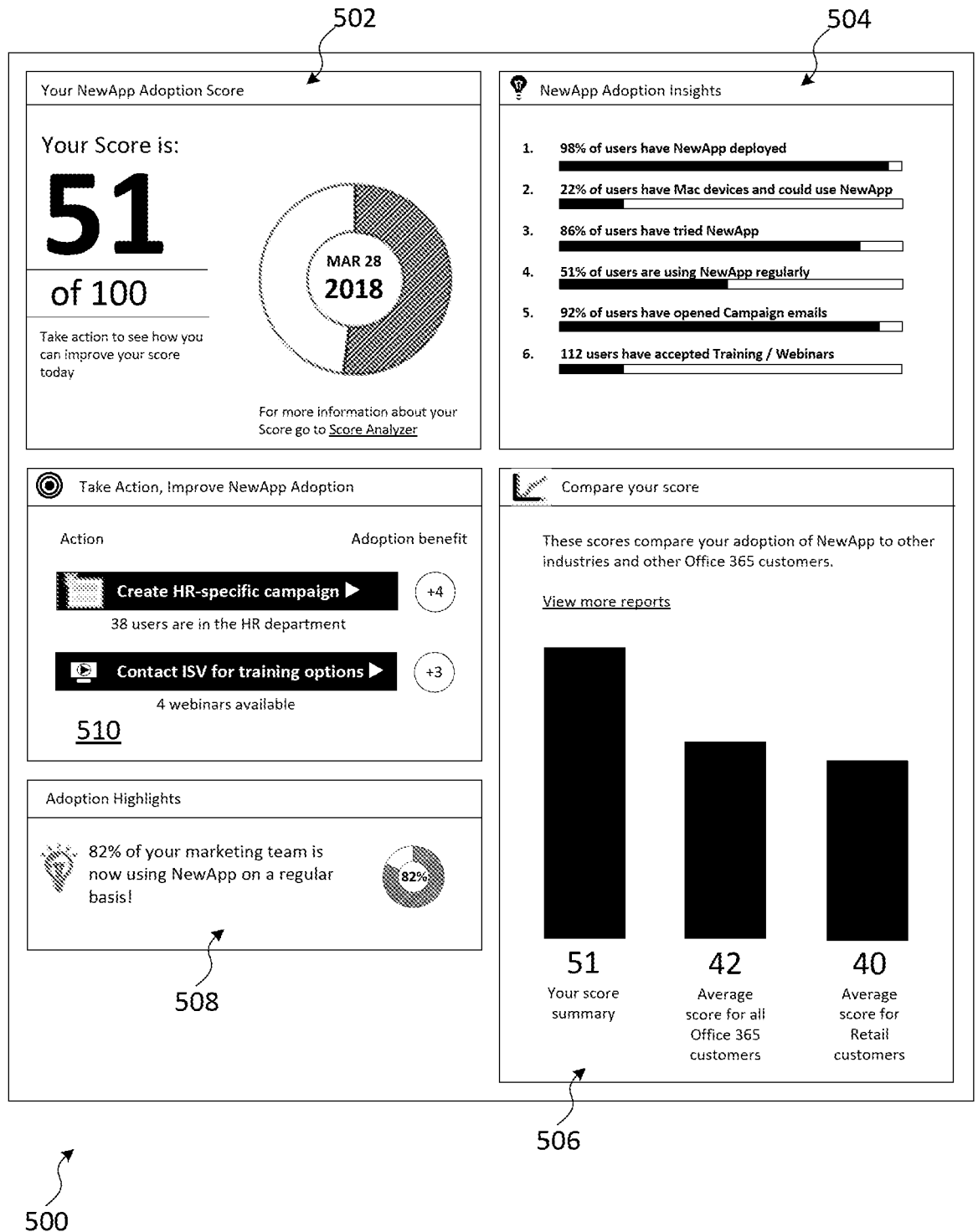
FIG. 5 illustrates a graphical user interface element for use with the system of FIG. 1 according to some embodiments.

Regardless of whether the usage level is weighted, when the usage level exceeds the target user engagement level (at block 312), the method 300 may begin again to continuously update usage data and target user engagement levels and execute the workflow actions to meet the updated target user engagement levels. In other embodiments, when the usage level goal has been met, the method 300 ends. In some embodiments, the electronic processor 202 produces a usage report (from data in the usage database 106) for all or part of the organization, indicating that which or how many of the plurality of users have met their usage goals. In some embodiments, usage reports are emailed to relevant parties. In some embodiments, usage reports are presented via the administrative interface 122 (FIG. 5 include a sample usage report 500).

Alternatively, when the usage level (or the weighted usage level) fails to exceed the target user engagement level (at block 312), the electronic processor 202 executes an additional workflow action for the user (at block 314). The additional workflow action may include actions similar to the first workflow action (for example, sending a follow-up email). In some embodiments, the additional workflow action is different from the first workflow action. For example, when the first workflow action is an email notification to the user, the second may be generating an email to a manager of the user, informing the manager that one of their employees has yet to complete their training or engage with the software service, or the like. In another example, the relationship between the user and the person who is notified may not map directly to the hierarchical structure within the organization. For example, a business owner may be nominated by the administrator to receive the emails, even if the business owner is not the direct manager of the user. In another example, the additional workflow action may be presenting a training document or a training video, which the user may be required to read or watch before moving on to other computing tasks. In some embodiments, the additional workflow action is the addition of an in-person training appointment to the user's electronic calendar. Similar rules may apply in non-business organizations. For example, in an educational institution, a teacher may be informed when a student has not completed training or increased his or her engagement with the software.

In some embodiments, the server 102 may look at aggregate usage for multiple users when deciding whether to execute an additional workflow action for an individual user. For example, when a significant portion of the plurality of users is using a new software service, the server 102 may cease the workflow to preserve resources. In such embodiments, the electronic processor 202 determines a target aggregate usage level for the plurality of users (for example, 70% of users must use the software service daily). In such embodiments, the electronic processor 202 determines an aggregate usage level for the plurality of users based on the usage level for the user and at least one other received usage level of at least one other user. The electronic processor 202 compares the aggregate usage level for the plurality of users to the target aggregate usage level for the plurality of users. In such embodiments, the electronic processor 202 executes the additional workflow action for the user when the user's usage level fails to exceed the target user engagement level and the aggregate usage level fails to exceed the target aggregate usage level. For example, when an individual user has not met his or her goal, but the aggregate usage exceeds 70%, the individual user will not receive further actions. In some embodiments, the aggregate usage level is updated continuously. In such embodiments, when the aggregate usage levels falls below target, users who were previously not subject to actions then would be.

As illustrated in FIG. 3, in some embodiments, the electronic processor 202 continues executing additional workflow actions according to the method 300 (blocks 308 through 314) until the target user engagement level has been exceeded. In some embodiments, the workflow actions increase in severity or frequency over time. For example, when a user is initially failing to meet the target user engagement level, reminder emails may be sent to the user. As time passes without the user increasing his or her use of the software service, additional workflow actions may include presenting training videos and tutorials to the user. If more time passes without the user increasing his or her use of the software service, additional workflow actions may include sending notifications (for example, emails) to the user's supervisors, project stakeholders for the software service, and the like.

In some embodiments, multiple escalating target usage levels are set. For example, an initial rollout of a software service may include workflow actions aimed at getting the users to use the software service minimally. A subsequent workflow may be aimed at increasing the depth of the users' engagement with the software service. For example, the subsequent workflow may include target usage levels for using particular software features at a desired frequency over a period of time.

FIG. 4 illustrates an example graphical user interface for use with the system 100. In particular, FIG. 4 illustrates an example administrative interface 122. As described above, the administrative interface 122 may allow an administrator to define the workflow, including target levels, actions, and the like. In the example illustrated, the administrative interface 122 includes a summary section 402, a recommended actions section 404, a groups section 406, and a timeline 408. The summary section 402 presents information on the status of the adoption or usage campaign (that is, the workflow), including an overall progress indicator 410. The recommended actions section 404 allows an administrator to identify stakeholders for the software service and organize training and training collateral for use with the workflow. The groups section 406 allows an administrator to specify groups of users and target usage levels for the user groups. The timeline 408 illustrates a timeline for the workflow, indicating when particular workflow actions will be executed (for example, according to the method 300).

FIG. 5 illustrates an example graphical user interface for use with the system 100. In particular, FIG. 5 illustrates an example report 500 provided, for example, using the administrative interface 122. In the example illustrated, the report 500 includes an adoption score section 502, a insights section 504, a comparison section 506, a highlights section 508, and an action section 510. The adoption score section 502 presents an overall score (for example, out of 100 points) for the adoption campaign. The insights section 504 provides statistics for individual aspects of the adoption campaign (for example, how many users have the application deployed, have tried the application, have participated in training, and the like). The comparison section 506 presents comparisons to other organizations running similar adoption campaigns. The highlights section 508 presents statistics that indicate a particular level of success within the organization, for example, as illustrated, that 82% of the marketing team is using the application regularly. The action section 510 presents possible workflow actions to add to the workflow (for example, to be executed according to the method 300), along with potential increases to the adoption score based on the workflow actions.

Figure 6:
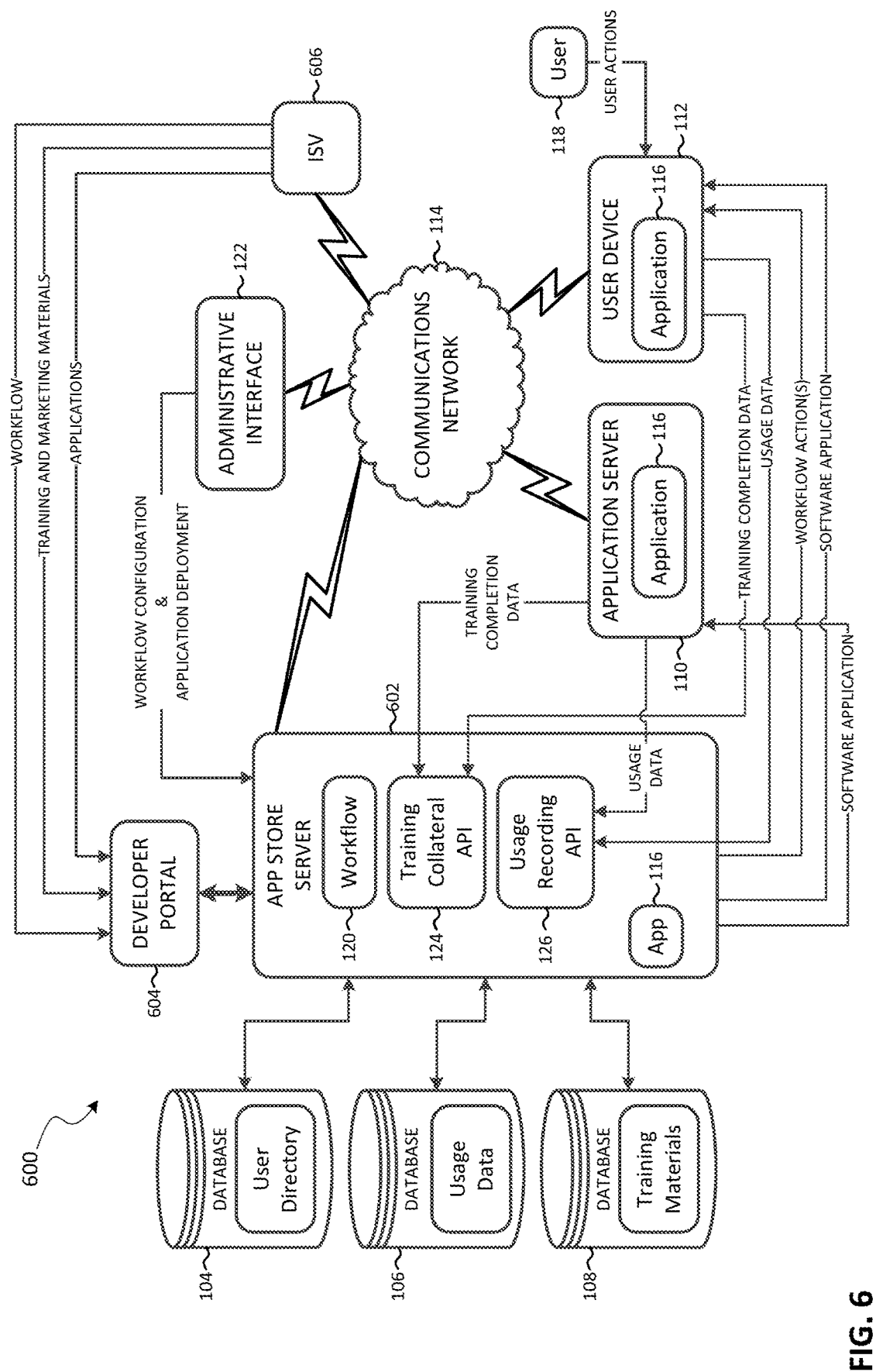
FIG. 6 schematically illustrates a system 600 for increasing usage of software applications deployed with an application store.

Embodiments of the systems and methods provided herein may be used to provide a platform for multiple software providers to increase usage for their respective applications. For example, FIG. 6 schematically illustrates a system 600 for increasing usage of a software application deployed via application store server 602 (an "app store"). In the example illustrated in FIG. 6, the system 600 includes an application store server 602 and a developer portal 604. The system 600 also includes similar components as the system 100, including a user database 104, a usage database 106, a training materials database 108, an application server 110, a user device 112, and an administrative interface 122. Such components are configured similarly to and operate similarly as described above with respect to FIG. 1.

The application store server 602 provides an "app store" platform, from which organizations and individual users can download applications (for example, the application 116 for use on the application server 110, the user device 112, or both). The application store server 602 includes similar hardware as the server 102, as described above, and operates similarly. One or more independent software vendors (ISVs), for example, the ISV 606 develop applications (for example, the application 116) and submit them to the application store server 602 via the developer portal 604. In some embodiments, the developer portal 604 is generated by the application store server 602 (for example, using a web-based application). In other embodiments, the developer portal 604 is separate from and interacts with the application store server 602. For example, the developer portal 604 may be a dedicated software application executed by a remote computing device, accessing the application store server 602 through the communications network 114. As illustrated in FIG. 6, the ISV 606 also submits marketing materials and information describing the application, training materials, and workflows relating to the application to the application store server 602 via the developer portal 604. In some embodiments, an administrator of an organization may configure the application store server 602 to deploy particular developer-submitted applications (for example, the application 116) to the users (for example, via the administrative interface 122). When the application 116 is deployed (for example, to the application server 110 or the user device 112), the user is registered with a workflow and training materials for the application 116. In some embodiments, users fetch applications directly from the application store server 602 and are registered with the appropriate workflow and training materials.

ISVs may use the systems and methods described herein to target the features (software services) to increase usage of based on particular types of users. For example, the application store server 602 may select features used by other "power users" or highly productive people within an organization. In another example, the application store server 602 may select features used by similar organizations (for example, based on industry). In another example, the application store server 602 may select features that are the most highly ranked in satisfaction surveys (for example, within the organization or in similar organizations). By targeting an increase in usage of these features, the ISV can provide an organization with an application and help to increase productivity and user satisfaction by increasing usage in particular features within the organization.

In some embodiments, systems and methods described herein are used to select a mixture of new, relevant, and productivity features for which to increase usage. For example, when a segment of the user population is upgrading from an older version of software than the rest of the user population, a large quantity of features may be new to them, but not to others. In such an example, simply increasing the usage of new features may not have the same productivity gains as increasing the use of particular features that are more relevant to an organization's mission or business goals.

In some embodiments, embodiments of the systems presented herein analyze, for example, using machine learning, the usage data and training completion data to determine which training materials are leading to increased usage, and which may not be as effective. In such embodiments, organizational leaders or ISVs can be notified regarding the effectiveness of the training materials, giving them the opportunity to improve on the less effective training.

In some embodiments, usage levels, as described above with respect to FIG. 3, are a measurement of how often a software service is launched by a user, how many minutes the user spends using that software service, or both. However, for some software services, such measurements may not provide a meaningful indication of usage. For example, an interaction point may only be a single button to launch the software service, and the software service may be a back-end solution (for example, a document archiving service), and thus there may be little to no depth of user interaction with the software service. As noted above, there are many possible indicators of meaningful usage that can be used to determine that users within an organization are actually using a software solution successfully (for example, opening documents, printing documents, sharing documents, saving database records, marking support tickets as 'resolved', and the like). Furthermore, with some software solutions, there is a subset of users that are authors (for example, who create sales dashboards or generate custom timesheets that need to be filled in by others), and a subset of users that are consumers of what is authored (for example, who look at certain views of the sales dashboards, or log time to the timesheets). Thus, a single software solution may require different training materials and different usage levels depending on the user base. Finally, it may be the case that a user has to use multiple specific functions in order to be considered trained (successfully using the software service to desired usage levels). In order to add value for an enterprise with many software services or an application store for many ISVs, the system needs to determine which users are considered trained and which are not by using the workflows to determine whether to communicate with a given user (or their manager), and then what to communicate to that user. Similarly, an ISV or an organization's management will benefit from understanding the level of training at an aggregated level within an organization.

Accordingly, in some embodiments, the usage recording API 126 is intrinsically extensible. In one example embodiment, the first workflow action may be sending an announcement of new customer support service to three users. In such an embodiment, the electronic processor 202 may receive the following usage data for the first user: 'ISV APPLICATION=987 USERID=1 TIMEDATE=20190505-1345:40

USAGE-LEVEL=100 SCENARIO=1 DATA-LABEL=ResolveSupportTicket'. The usage level of '100' indicates that, for that ISV's app, a given user at a given time has taken an action reflecting a deep level of usage because they resolved a support ticket. In another example, the second user may have opened a support ticket, producing the following usage data: 'ISV APPLICATION=987 USERID=2 TIMEDATE=20190505-1142:40 USAGE-LEVEL=20 SCENARIO=1 DATA-LABEL=OpenSupportTicket'. The second user may also use the solution again later, producing the following usage data: 'ISV APPLICATION=987 USERID=2 TIMEDATE=20190506-1031:30 USAGE-LEVEL=60 SCENARIO=1 DATA-LABEL=TransferSupportTicket'. The third user may not have used the software solution at all. All of the usage data refer to a 'scenario 1', which, in this example, indicates the resolution of support tickets. Other scenarios may be defined, for example, a second scenario may be the administration of the support service such as altering workload, defining incoming rules for routing support tickets, and the like.

After a period of time, as noted above, the second workflow action is executed. An ISV (for example, as part of uploading the workflow), or an administrator using the administrative interface 122, may have specified particular threshold rules to determine whom the second workflow action targets. In one example, a second email announcing training for 'scenario 1' will target all users who did not complete any activity at a level of 50 or above. In this example, the second and third users would receive the email generated by the second workflow action. In another example, the ISV may have specified in the workflow that the threshold for the second workflow action is users with a total activity of less than 70 since the first workflow action ran. In such example, only the third user would receive the email generated by the second workflow action. It should be noted that, while the actual logic to determine which action is at which level is customizable for each software solution, the ability for the ISV to map the custom actions back to a training score and a numbered scenario means that the workflows can still successfully execute the right training for the right users. It should also be noted that different workflows are possible for different scenarios, or that it is possible to define that a user is sufficiently trained when they have completed Scenario 1 AND Scenario 2 to an acceptable level, completed Scenario 1 OR Scenario 2 to an acceptable level, and the like. Because usage data includes custom labels, the ISV or organization can view, for example, via the administrative interface 122, general usage levels (for example, as a percentage of total users) and also which actions are most used and by how many users.

Thus, embodiments provide, among other things, systems and methods increasing usage for a software service. Various features and advantages of some embodiments are set forth in the following claims.

What is claimed is:

1. A system for increasing usage of a software service, the system comprising:
   at least one database storing workflow data for the software service, user profile data including a plurality of user profiles, each associated with one of a plurality of users, and individual software service usage data for the plurality of users; and
   at least one electronic processor communicatively coupled to the database and configured to
      determine a target user engagement level for the software service, wherein the target usage engagement level is set by an administrator of an organization to which the plurality of users belong and the target user engagement level is indicative of a desired level of usage of the software service by at least one user of the software service and wherein the desired level of usage includes a target level for at least one specified action within the software service, which specified action indicates substantive use of the software service;
      retrieve from the at least one database based on the software service, a first workflow action;
      execute the first workflow action for the plurality of users;
      receive, from the software service, a usage level for an individual user of the plurality of users, based on the individual software service usage data for the user, the usage level including an indication of whether the user has taken one or more specified actions within the software service indicating substantive use of the software service;
      compare the usage level for the individual user to the target user engagement level for the software service; and
      when the usage level for the individual user fails to exceed the target user engagement level, execute an additional workflow action, different from the first workflow action, for the individual user.

2. The system of claim 1, wherein the at least one electronic processor is further configured to, while the usage level for the individual user fails to exceed the target user engagement level,
   execute the first workflow action for the plurality of users;
   receive, from the software service, a second usage level for the individual user of the plurality of users;
   compare the second usage level for the individual user to the target user engagement level for the software service; and
   when the second usage level for the individual user fails to exceed the target user engagement level, execute an additional workflow action, different from the first workflow action, for the individual user.

3. The system of claim 1, wherein the at least one electronic processor is further configured to,
   determine a target aggregate usage level for the plurality of users;
   determine an aggregate usage level for the plurality of users based on the usage level for the user and at least one other received usage level of at least one other user;
   compare the aggregate usage level for the plurality of users to the target aggregate usage level for the plurality of users; and
   execute the additional workflow action for the user when the usage level fails to exceed the target user engagement level and the aggregate usage level fails to exceed the target aggregate usage level.

4. The system of claim 1, wherein the at least one electronic processor is further configured to
   generate an administrative interface for receiving at least one selected from the group consisting of a definition for the software service, a workflow action, and a target user engagement level.

5. The system of claim 1, wherein the at least one electronic processor is further configured to
   retrieve, from the at least one database, at least one user characteristic for the individual user;
   assign a weight to the usage level for the individual user based on the at least one user characteristic;

determine, for the individual user, a weighted usage level for the individual user based on the usage level and the weight; and compare the usage level for the individual user to the target user engagement level for the software service by comparing the weighted usage level for the individual user to the target user engagement level.

6. The system of claim 5, wherein the at least one electronic processor is further configured to receive a workflow relating to the software service from a vendor submitting the software service to a store application, wherein the workflow includes the target user engagement level for the software service, the first workflow action, and the additional workflow action.

7. The system of claim 1, wherein the first workflow action and the additional workflow action are one selected from the group consisting of generating an email to the individual user, generating an in-product notification, generating an email to a manager of the individual user, generating an email to a nominated business owner of the software service, presenting a training document, presenting a training video, and presenting a support website link.

8. The system of claim 1, wherein the usage level for an individual user of the plurality of users is indicative of at least one selected from the group consisting of a total usage by the individual user of the software service and an amount of usage by the individual user of the software service during a time window.

9. The system of claim 1, wherein the software service operates on an electronic device, and the usage level is indicative of the individual user using the software service in conjunction with a function of the electronic device.

10. A method for increasing usage for a software service, the method comprising:

determining, with at least one electronic processor, a target user engagement level for the software service, wherein the target usage engagement level is set by an administrator of an organization to which the plurality of users belong and the target user engagement level is indicative of a desired level of usage of the software service by at least one user of the software service and wherein the desired level of usage includes a target level for at least one specified action within the software service, which specified action indicates substantive use of the software service;

retrieving, from at least one database storing workflow data for the software service, user profile data including a plurality of user profiles, each associated with one of a plurality of users, and individual software service usage data for the plurality of users, a first workflow action based on the software service;

executing the first workflow action for the plurality of users;

receiving, from the software service, a usage level for an individual user of the plurality of users, based on the individual software service usage data for the user, the usage level including an indication of whether the user has taken one or more specified actions within the software service indicating substantive use of the software service;

comparing the usage level for the individual user to the target user engagement level for the software service;

when the usage level for the individual user fails to exceed the target user engagement level, executing an additional workflow action, different from the first workflow action, for the individual user; and while the usage level for the individual user fails to exceed the target user engagement level, executing the first workflow action for the plurality of users;

receiving, from the software service, a second usage level for the individual user of the plurality of users;

comparing the second usage level for the individual user to the target user engagement level for the software service;

when the second usage level for the individual user fails to exceed the target user engagement level, executing an additional workflow action, different from the first workflow action, for the individual user.

11. The method of claim 10, further comprising:

determining a target aggregate usage level for the plurality of users;

determining an aggregate usage level for the plurality of users based on the usage level for the user and at least one other received usage level of at least one other user;

comparing the aggregate usage level for the plurality of users to the target aggregate usage level for the plurality of users; and executing the additional workflow action for the user when the usage level fails to exceed the target user engagement level and the aggregate usage level fails to exceed the target aggregate usage level.

12. The method of claim 10, further comprising:

generating an administrative interface for receiving at least one selected from the group consisting of a definition for the software service, a workflow action, and a target user engagement level.

13. The method of claim 10, further comprising:

retrieving, from the at least one database, at least one user characteristic for the individual user;

assigning a weight to the usage level for the individual user based on the at least one user characteristic; and determining, for the individual user, a weighted usage level for the individual user based on the usage level for the individual user and the weight;

wherein comparing the usage level for the individual user to the target user engagement level for the software service includes comparing the weighted usage level for the individual user to the target user engagement level for the software service.

14. The method of claim 13, wherein retrieving the at least one user characteristic for the individual user includes retrieving at least one user characteristic from an active directory of the at least one database.

15. The method of claim 10, wherein executing the first workflow action includes executing one selected from the group consisting of generating an email to the individual user, generating an in-product notification, generating an email to a manager of the individual user, generating an email to a nominated business owner of the software service, presenting a training document, presenting a training video, and a presenting a support website link.

16. The method of claim 10, wherein executing the additional workflow action includes executing one selected from the group consisting of generating an email to the individual user, generating an in-product notification, generating an email to a manager of the individual user, presenting a training document, presenting a training video, and presenting a support website link.

17. The method of claim 10, wherein receiving the usage level for the individual user includes receiving a usage level indicative of at least one selected from the group consisting of a total usage by the individual user of the software service and an amount of usage by the individual user of the software service during a time window.

18. The method of claim 10, wherein receiving the usage level for an individual user of the plurality of users includes receiving, from a software service that operates on an electronic device, a usage level indicative of the individual user using the software service in conjunction with a function of the electronic device.

19. Non-transitory computer-readable medium including instructions executable by an electronic processor to perform a set of functions, the set of functions comprising:
   determining, with at least one electronic processor, a target user engagement level for a software service, wherein the target usage engagement level is set by an administrator of an organization to which the plurality of users belong and the target user engagement level is indicative of a desired level of usage of the software service by at least one user of the software service and wherein the desired level of usage includes a target level for at least one specified action within the software service, which specified action indicates substantive use of the software service;
   retrieving, from at least one database storing workflow data for the software service, user profile data including a plurality of user profiles, each associated with one of a plurality of users, and individual software service usage data for the plurality of users, a first workflow action based on the software service;
   executing the first workflow action for the plurality of users; and
   receiving, from the software service, a usage level for an individual user of the plurality of users, based on the individual software service usage data for the user, the usage level including an indication of whether the user has taken one or more specified actions within the software service indicating substantive use of the software service;
   comparing the usage level for the individual user to the target user engagement level for the software service;
   when the usage level for the individual user fails to exceed the target user engagement level, executing an additional workflow action, different from the first workflow action, for the individual user; and
   while the usage level for the individual user fails to exceed the target user engagement level,
      executing the first workflow action for the plurality of users;
      receiving, from the software service, a second usage level for the individual user of the plurality of users;
      comparing the second usage level for the individual user to the target user engagement level for the software service;
      when the second usage level for the individual user fails to exceed the target user engagement level, executing an additional workflow action, different from the first workflow action, for the individual user.

20. The non-transitory computer-readable medium of claim 19, wherein executing the first workflow action includes executing the first workflow action for one of the plurality of users in response to an action taken by the one of the plurality of users, wherein the action includes at least selected from a group consisting of launching the software service or a different software service, accessing predetermined data within the software service or a different software service, and performing a predetermined action within the software service or a different software service.

* * * * *